(12) United States Patent
Buzzetti

(10) Patent No.: US 6,454,631 B1
(45) Date of Patent: Sep. 24, 2002

(54) POLISHING APPARATUS AND METHOD

(76) Inventor: Mike Buzzetti, 4401 "D" El Camino Real, Atascadero, CA (US) 93422

( * ) Notice: Subject to any disclaimer, the term of this patent is extended or adjusted under 35 U.S.C. 154(b) by 0 days.

(21) Appl. No.: 10/013,435

(22) Filed: Dec. 8, 2001

Related U.S. Application Data

(63) Continuation-in-part of application No. 09/855,952, filed on May 14, 2001, which is a division of application No. 09/177,794, filed on Oct. 22, 1998, now Pat. No. 6,302,763, which is a continuation-in-part of application No. 09/106,328, filed on Jun. 29, 1998, now abandoned.

(51) Int. Cl.$^7$ .................................................. B24B 7/60
(52) U.S. Cl. ........................... 451/11; 451/41; 451/164; 451/166
(58) Field of Search ................................ 451/9, 10, 11, 451/41, 36, 164, 166, 170, 271, 273, 278

(56) References Cited

U.S. PATENT DOCUMENTS

| | | |
|---|---|---|
| 3,436,562 A | 4/1969 | Maillet |
| 3,769,763 A | 11/1973 | Mayo |
| 4,693,035 A | 9/1987 | Doyle |
| 4,831,784 A | 5/1989 | Takahashi |
| 4,850,152 A | 7/1989 | Heynacher |
| 4,891,916 A | 1/1990 | Rhoades et al. |
| 4,979,334 A | 12/1990 | Takahashi |
| 5,007,209 A | 4/1991 | Saito et al. |
| 5,048,929 A | 9/1991 | Watanabe et al. |
| 5,107,627 A | 4/1992 | Mock, Jr. et al. |
| 5,184,433 A | 2/1993 | Maack |
| 5,201,148 A | 4/1993 | Rupert et al. |
| 5,216,846 A | 6/1993 | Takahashi |
| 5,349,784 A | 9/1994 | Grois et al. |
| 5,454,747 A | 10/1995 | Ascalon |
| 5,458,531 A | 10/1995 | Matsuoka et al. |
| 5,480,344 A | 1/1996 | Xu et al. |
| 5,497,443 A | 3/1996 | Jie et al. |
| 5,516,328 A | 5/1996 | Kowada |
| 5,558,564 A | 9/1996 | Ascalon |
| 5,559,916 A | 9/1996 | Terao et al. |
| 5,674,114 A | 10/1997 | Miller et al. |
| 5,743,787 A | 4/1998 | Tshiyama et al. |
| 5,895,311 A | 4/1999 | Shiotani et al. |

*Primary Examiner*—Eileen P. Morgan
(74) *Attorney, Agent, or Firm*—Leo F. Costello

(57) ABSTRACT

An apparatus and method for polishing, especially adapted for polishing fiber optic connectors and similarly configured industrial components. The polishing apparatus includes a first stage having a first mounting member and a first staging member supported on the first mounting member for reciprocal movement along a first path; a second stage having a second mounting member supported on the first staging member and a second staging member supported on the second mounting member for reciprocal movement along a second path in angular relation to the first path; a polishing member mounted on the second staging member; and a drive mechanism operable to simultaneously reciprocate the first and second staging member along their respective paths so that the polishing member traces a predetermined pattern. The method of polishing involves reciprocating the first stage along its path, and reciprocating the second stage along its path in a predetermined timed relationship so that the polishing member traces the predetermined pattern. The subject invention enables the polishing member to be moved along a uniform and constant figure eight polishing pattern, which pattern is mechanically created and maintained during the polishing action, either by pulleys and linkages or by cams and cam followers. The method and apparatus are suited for simultaneously polishing a large number of fiber optic connectors or similar items.

20 Claims, 9 Drawing Sheets

POLISHING APPARATUS AND METHOD

CROSS REFERENCE TO RELATED APPLICATIONS

This application is a continuation-in-part of my prior copending application Ser. No. 09/855,952, filed May 14, 2001 pending, entitled Method and Apparatus for Polishing which in turn is a division of my prior application Ser. No. 09/177,794, filed Oct. 22, 1998, entitled Method and Apparatus for Polishing, now U.S. Pat. No. 6,302,763, which in turn is a continuation-in-part of my prior application Ser. No 09/106,328, filed Jun. 29, 1998, entitled Process for Creating, by Mechanical Means a Controlled figure eight Polishing Pattern for Use in the Manufacture and Operation of A Fiber Optic Connector Polishing Machine Capable of Simultaneously Polishing 12 to 36 Connectors, now abandoned, each of said earlier applications being incorporated in their entirety by reference herein.

FIELD OF THE INVENTION

The present invention pertains to an apparatus and method for polishing and more particularly to apparatus and method for controlling the movement of a polishing member along a predetermined path.

BACKGROUND

Fiber optic connectors are required in large quantities in the telecommunications and cable television markets for the manufacture and use of fiber optic assemblies and components. In order to enable the connectors to provide the optimum transmission path for the fiber optic cables, the ends of the connectors require special polishing. As explained in my prior applications, machines for polishing fiber optic connectors that polish only in a circular pattern do not produce the most effective polish. Moreover, such machines polish no more than eighteen connectors at one time.

The art of polishing fiber optic connectors has been derived from the art of polishing gemstones. Basically, a gem stone polishing apparatus includes a rotating platter against which the gemstone is moved to effect polishing. This gemstone polishing technique was initially adopted for polishing fiber optic connectors and then subsequently modified. The polishing surface in such gemstone polishing apparatus thus travels in a circular pattern, and the gemstone polishers modified to polish fiber optic connectors have likewise employed a circular pattern.

It is known, however, that a more effective polish can be obtained if the polishing surface travels in a figure eight pattern, rather than a circular pattern, as the polishing surface moves over the connector. The figure eight pattern, if it can be obtained and maintained during the polishing operation, provides the optimum method of polishing the end faces of fiber optic connectors. A constant figure eight pattern produces the best radii and apex shift obtainable on the spherical ends of the connectors and on similarly configured industrial components.

Not only is a circular pattern less effective in creating the desired polish on the connectors, it limits the number of connectors that can be polished at the same time. As shown in the Kawada U.S. Pat. No. 5,516,328, such a polisher rotates and revolves and thereby traces circular polishing paths that are revolved about a center. As a result, the connectors must be located at the periphery in a circular formation with no connectors in the center, whereby fewer connectors can be polished than if the formation included connectors in the center.

SUMMARY

An apparatus and method for polishing, especially adapted for polishing fiber optic connectors and similarly configured industrial components, is provided. The polishing apparatus includes a first stage having a first mounting member and a first staging member supported on the first mounting member for reciprocal movement along a first path; a second stage: having a second mounting member supported on the first staging member and a second staging member supported on the second mounting member for reciprocal movement along a second path in angular relation to the first path; a polishing member mounted on the second staging member; and a drive mechanism operable simultaneously to reciprocate the first and second staging members along their respective paths so that the polishing member traces a predetermined pattern. The method of polishing involves reciprocating the first stage along its path, and reciprocating the second stage along its path in a predetermined timed relationship so that the polishing member traces the predetermined pattern. The subject invention enables the polishing member to be moved along a constant and uniform figure eight polishing pattern, which pattern is mechanically created and maintained during the polishing action, either by pulleys and linkages or by cams and cam followers. The apparatus and method are suited for simultaneously polishing a large number of fiber optic connectors or similar items.

An object of this invention is to provide an optimum polishing pattern for polishing fiber optic connectors, or similar items.

Another object is to create and maintain a uniformly constant figure eight polishing pattern especially suited for polishing fiber optic connectors or similar items.

A further object is to provide a polishing apparatus that creates a figure eight polishing pattern mechanically, such as with pulleys and linkages or with cams.

An additional object is to be able to polish a large number of fiber optic connectors, or similar items, simultaneously.

Yet another object is to produce optimum quality polishing of fiber optic connectors or similar items.

Still another object is to incorporate a figure eight polishing pattern into a compact polishing apparatus.

A further object is to be able to produce higher quality polished fiber optic connectors, or similar products, more rapidly, in greater quantities, and with lower unit costs than is obtainable with the prior known polishing techniques.

A still further object is to provide a polishing apparatus that is easy to operate, requires minimum maintenance, and has a very long life expectancy.

These and other objects will become apparent upon reference to the following description and claims and to the accompanying drawings.

DETAILED DESCRIPTION OF THE FIRST EMBODIMENT

Figure 1:
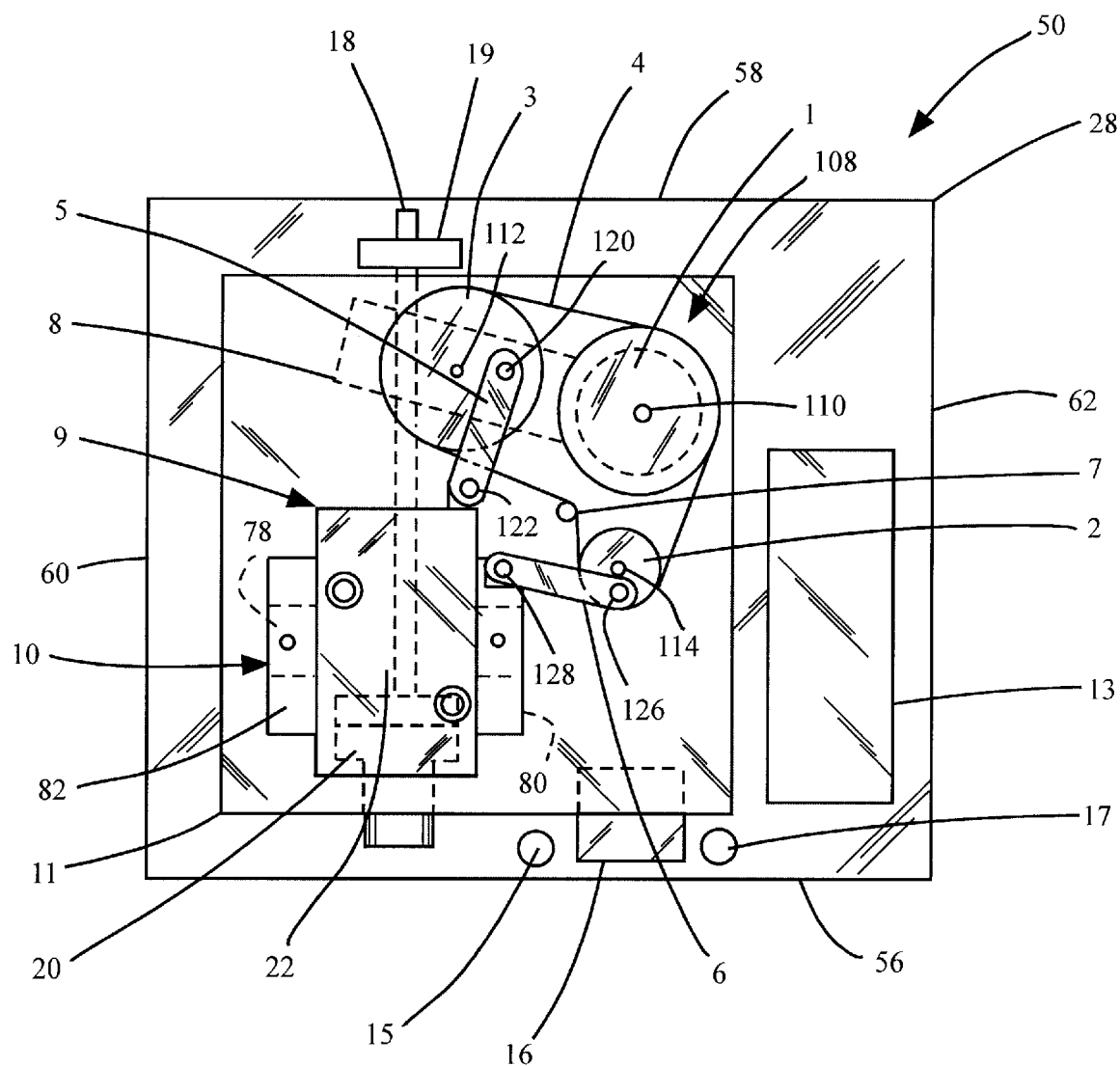
FIG. 1 is a schematic top plan view of a first embodiment of a subject polishing apparatus incorporating the principles of the present invention with the casing of the apparatus opened to show the components inside of the casing.
Figure 2:
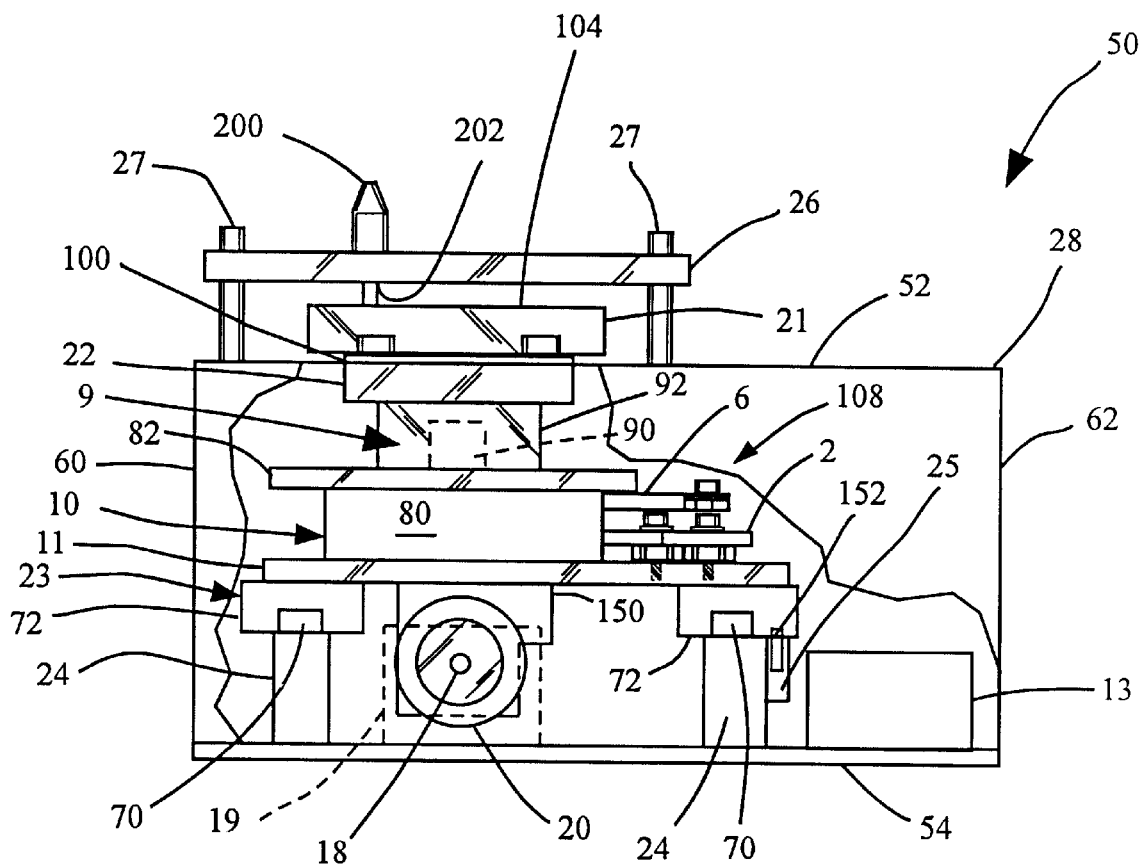
FIG. 2 is an enlarged front elevation of the apparatus shown in FIG. 1 but with the front wall of the casing broken away so as to show the components inside of the casing.

A first embodiment of a polishing apparatus constructed in accordance with the principles of the present invention is generally indicated by the reference numeral 50 in FIGS. 1 and 2. The polishing apparatus includes a generally rectangular casing or housing 28 having a flat top wall 52, a flat bottom wall 54, a front wall 56, a back wall 58, and left and right side walls 60 and 62 respectively. With particular reference to FIG. 2, two elongated, transversely spaced mounting blocks 24 are secured to the bottom wall of the casing and extend generally from adjacent to the front wall to adjacent to the back wall in substantially parallel relationship to the side walls.

An x2 stage 23 includes a pair of elongated, x2 stage tracks 70 secured to the mounting blocks 24 and extending substantially the full length thereof. Accordingly, these stage tracks define an x2 axis or path generally parallel to the side walls 60 and 62. The x2 stage also includes inverted U-shaped x2 stage bodies or members 72 individually slidably mounted on the stage tracks for movement along the x2 axis. The x2 stage further includes a substantially flat x2 stage plate 11 bridging and secured to the stage bodies and in a horizontal position when the bottom wall 54 of the casing is horizontal. The x2 stage plate is rectangular and flat and occupies a large area within the casing although being of slightly smaller outside dimensions than the casing, as best seen in FIG. 1. Moreover, the x2 stage plate is disposed slightly to the left of the casing, as seen in FIG. 1, thereby leaving space between the stage plate and the right side wall 62. Accordingly, the x2 stage plate and the stage bodies have freedom to move forwardly and rearwardly within the casing on the stage tracks. The length of the stroke of movement of the stage plate is relatively minimal and is preferably approximately from ¾ inch to 1 inch of travel.

The subject polishing apparatus 50 (FIGS. 1 and 2) also includes a y stage 10 having a single elongated y stage track 78 that is mounted on and secured to the x2 stage plate 11 in generally the front left corner of the x2 stage plate, as best shown in FIG. 1. The y stage track is in right angular relation to the x2 axis and thus defines a y-axis or path perpendicular to the x2 axis and parallel to the front and rear walls 56 and 58 of the casing 28. An inverted, U-shaped y stage body or member 80 is slidably mounted on the y stage track, and a y stage plate 82 is secured to the y stage body in generally parallel relation to the x2 stage plate 11. The y stage plate is also flat and rectangular but is much smaller in outside dimensions than the x2 stage plate, as best seen in FIG. 1. Thus, the y stage plate and the y stage body are reciprocally moveable on the y stage track along the y-axis and have a predetermined stroke to which reference will subsequently be made.

Still further, the polishing apparatus 50 (FIGS. 1 and 2) includes an x1 stage 9 having an x1 stage track 90 secured to the y stage plate 82 in right angular relation to the y stage track and thus defining an x1 axis perpendicular to the y axis and parallel to the side walls 60 and 62 and x2 axis. The x1 stage also includes an inverted U-shaped x1 stage body or member slidably mounted on the stage track for reciprocal movement along the x1 axis. An x1 stage plate or interface plate 22 is secured to the x1 stage body in generally parallel relation to the y stage plate 82 and the x2 stage plate 11 (FIG. 2). Moreover, the x1 stage plate (FIG. 1) is of a shape similar to the y stage plate 82 and is generally perpendicular to it. Thus, the x1 stage plate is mounted for movement with the x1 stage body along the x1 axis defined by the x1 stage track.

The generally square base plate 21 (FIGS. 1 and 2) is disposed above the top wall 52 of the casing 28 in parallel relation thereto and is secured to the x1 stage plate 22 through an opening 100 in the top wall of the casing. The base plate has a flat, top polishing surface 104 to which a polishing media, such as a film or a slurry, is applied for effecting the polishing action. These polishing media and their application are well known in the art and are thus not described in any detail herein.

With particular reference to FIG. 1, a drive mechanism 108 includes a main drive pulley 1 located generally in the upper right hand corner of the x2 stage plate 11 and has a drive shaft 110 rotatably mounted on the x2 stage plate. An x1 drive pulley 3 has its drive shaft 112 also rotatably mounted on the x2 stage plate in laterally offset relationship to the main drive pulley. A y drive pulley 2 has its drive shaft 114 also rotatably mounted on the x2 stage plate in forwardly spaced relation to the main drive pulley. Furthermore, an idler pulley 7 is interposed the x1 and y drive pulleys, a timing belt 4 connects all of the pulleys, and a main drive motor 8 is connected to the main drive shaft 110 for imparting rotation to the pulleys. It is thus to be observed that all of these pulleys are in a common plane parallel to the x2 stage plate 11, that the diameters of the main and x1 drive pulleys are the same, and that the diameter of the y drive pulley is less than the diameter of the x1 drive pulley. Accordingly, the speed of rotation of the y pulley is greater than the speed of rotation of the x1 pulley. An x1 connecting rod 5 is connected by pin 120 to the x1 drive pulley and by pin 122 to the rearward end of the x1 stage plate 22. A y connecting rod 6 is connected by a pin 126 to the y drive pulley 2 and by a pin 128 to the right end of the y stage plate 82.

Figure 4:
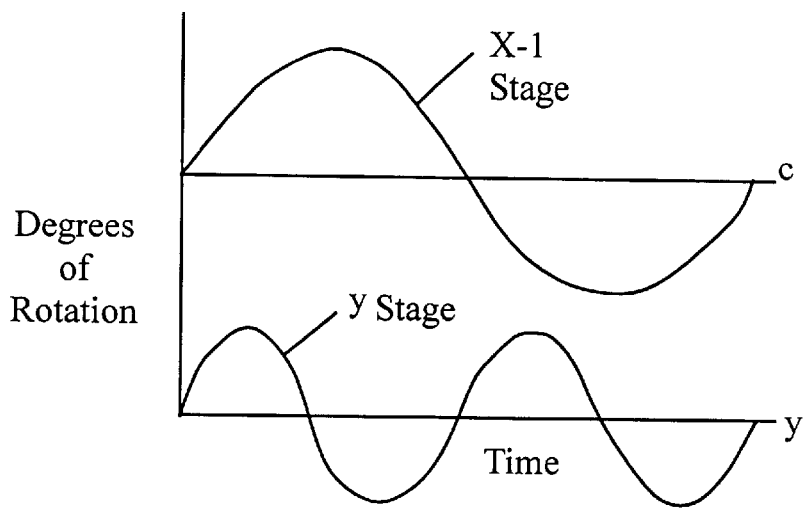
FIG. 4 are timing diagrams of two stages of the subject polishing apparatus and method.
Figure 5:
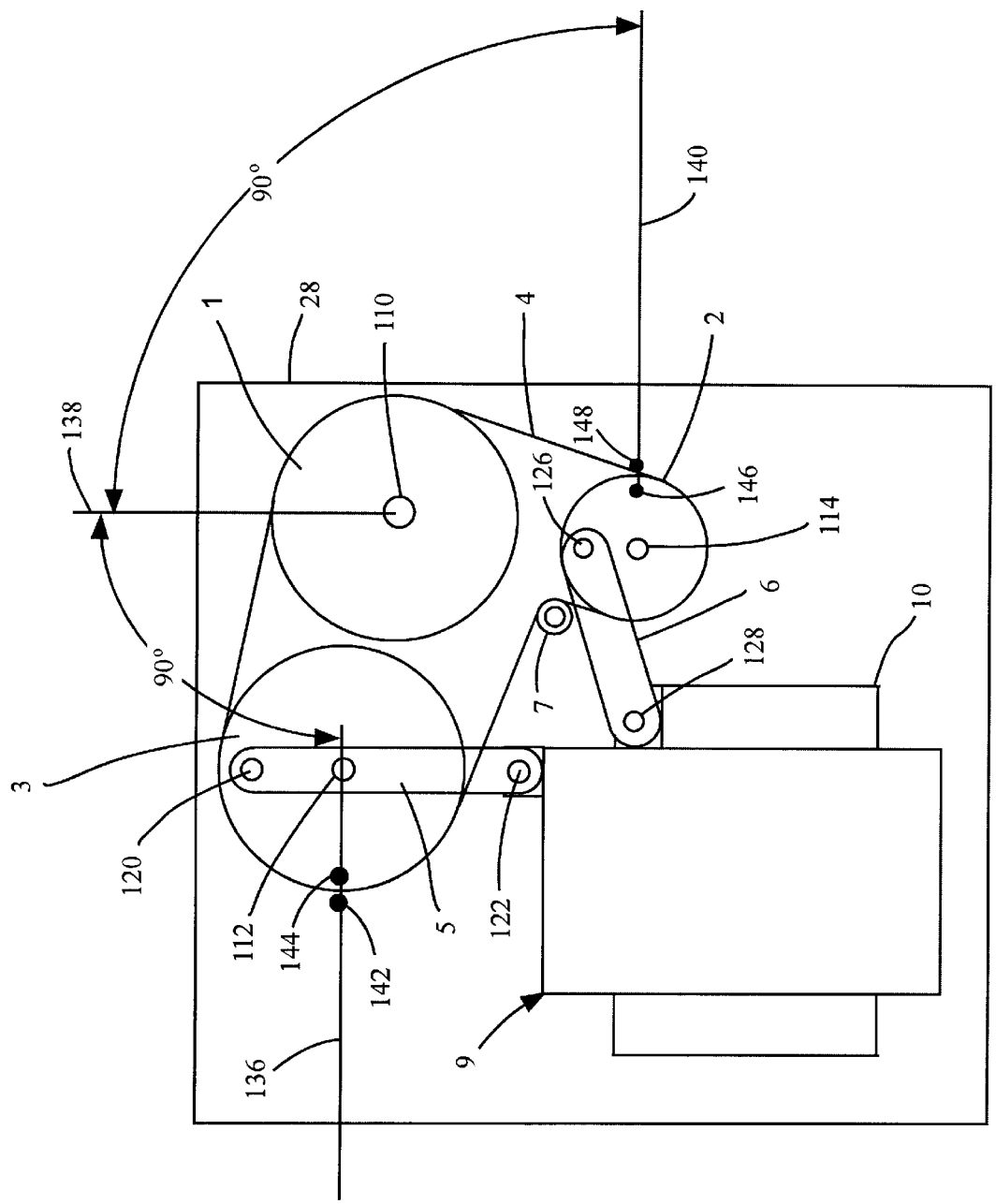
FIG. 5 is a view similar to FIG. 1 but is a schematic showing angular relationships among the parts of the drive mechanism for the first embodiment of the subject apparatus.

With reference to FIGS. 4 and 5, certain relationships of the drive mechanism 108 are now described. With the drive pulleys 1, 2 and 3 and the connecting rods 5 and 6 in the positions shown in FIG. 5, the connecting rod 5 is aligned with the x1 axis and extends diametrically of the x1 drive pulley. At this same time in the cycle of movement of the drive mechanism, the connecting pin 126 for the y connecting rod 6 is at its rearward most position. In adjusting the positions of the pulleys during installation thereof, the described relationship of the x1 and y connecting rods 5 and 6 to their respective pulleys 3 and 2 is accomplished by insuring the ninety degree relationships shown in FIG. 5. That is, in this setting position for the timing of the drive mechanism, there is a ninety degree angle between the x reference line 136 and the main reference line 138 and a ninety degree angle between the main reference line 138 and the y reference line 140. Such adjustments insures proper timed movements of the x1 and y stage plates 22 and 82, respectively. Alignment of the x1 timing dots 142 and 144 respectively on the x2 stage plate 11 and the x1 drive pulley 3 and alignment of the y timing dots 146, 148 respectively on the x2 stage plate 11 and the y drive pulley 2 insure proper setting of the correct timing relationships.

In the first embodiment (FIGS. 1, 2, and 5) of the subject apparatus 50, the main and x1 drive pulleys 1 and 3 each has a radius of 1.50 inches, and the y drive pulley 2 has a radius of 0.75 inches, whereby the diameter of the x1 drive pulley is two times the diameter of the y drive pulley. Although the exact dimensions of the pulleys are not critical in the present invention, the 2:1 ratio of the diameters of the x1 drive pulley to the y 1 drive pulley is critical to achieving a constant and uniform figure eight pattern. Because of this 2:1 ratio, it will be understood that the stroke of the x1 stage is 2 times the stroke of the y stage. Furthermore, the distance between the y reference line 140 and the center of the main drive shaft 110 is 2.4375 inches whereas the distance between the main reference line 138 and the center of the x1 drive shaft 112 is 2.8438 inches. The important point to note here is that although these specific dimensions are not critical and may be varied, the dimensional relationships are important and do control the figure eight pattern traced by the polishing surface 104.

With reference to FIGS. 1 and 2, a bracket 150 is secured to and depends from the x2 stage plate 11 adjacent to the front wall 56 of the casing 28. A lead screw 18 is rotatably received in the bracket and extends fore and aft of the casing in parallel relationship between the mounting blocks 24. A lead nut 19 is secured to the casing adjacent to the rear wall 58 and threadably receives the lead screw. An x2 drive motor 20 is connected to the lead screw so that upon rotation of the lead screw, the x2 stage plate 11 is moved forwardly and rearwardly within the casing along the x2 axis depending on the direction of rotation of the screw. Forward and rearward limits switches, as 25, are mounted on one of the mounting blocks 24 for engagement by strikers, as 152, that depend from one of the x2 stage bodies 72, as illustrated in FIG. 2. Thus, as the lead screw 18 rotates clockwise in FIG. 2, the x2 stage plate moves forwardly until the striker 152 engages the forward limit switch. Closure of the forward limit switch reverses the motor which causes the lead screw to rotate in a counterclockwise direction and move the x2 stage plate rearwardly. Upon the striker engaging the rearward limit switch, not shown, the motor again reverses and the cycle repeats. Engagement of the strikers with the limit switches thus causes reciprocal movement of the x2 stage plate, and thus both of the y and x2 stages, along the x2 axis.

In addition, the subject polishing apparatus 50 (FIGS. 1 and 2) includes a power supply 13, start and stop switches 17 and 15, and a timer 16. The power supply supplies power to the drive motors 8 and 20 and to the timer. The start and stop switches energize and de-energize the two motors. The timer is in the circuit with the two drive motors so as to control the amount of polishing time.

Although not part of the subject polishing apparatus 50, a polishing fixture 26 is illustrated in FIG. 2. This fixture is mounted on the top wall 52 of the casing 28 and straddles the base plate 21, being positioned by locating pins 27. The polishing fixture is capable of mounting a rectangular array of fiber optic connectors 200, only one of which is shown in FIG. 2. Each of these connectors is vertically disposed so as to have its end 202 to-be-polished in engagement with the polishing surface 104 of the base plate 21. Thus, when the polishing fixture is loaded with fiber optic connectors, there are rows and columns of connectors extending parallel to the x and y axes described above with the surfaces to-be-polished 202 all in engagement with the base plate 21. The connectors may be located on one inch centers thereby providing for the holding of large arrays of connectors in polishing positions. The embodiments of the polishing fixture shown and described herein respectively mount twelve, twenty-four, thirty-six and forty-eight connectors in such a rectangular array, it being understood that even more connectors may be accommodated using the figure eight polishing pattern of the present invention.

Operation of the First Embodiment

Figures 3A, 3B:
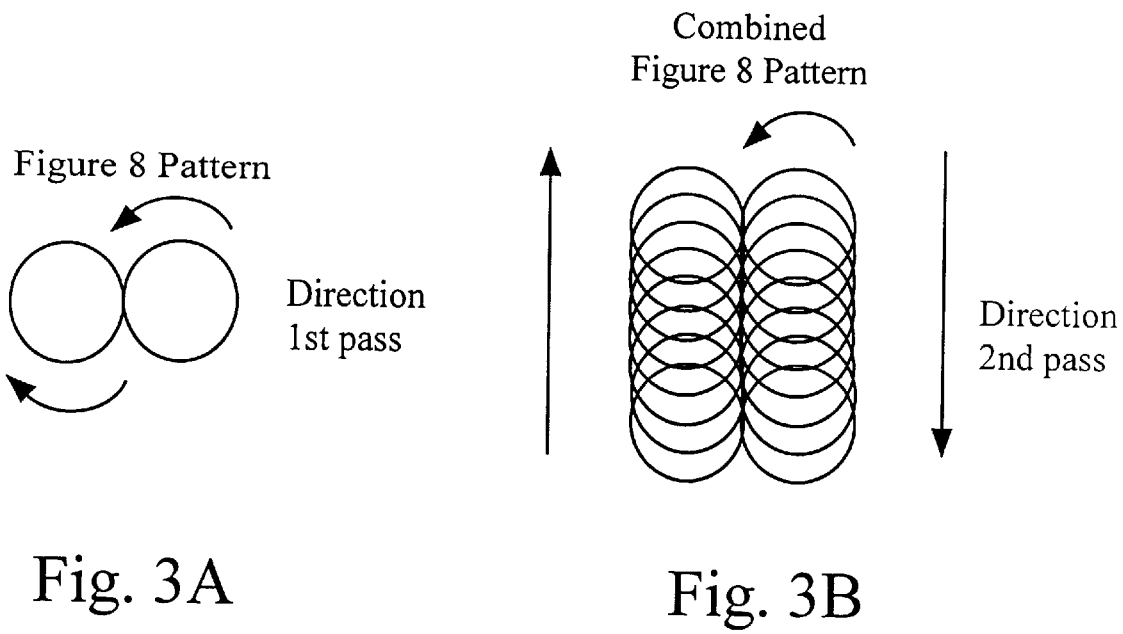
FIG. 3A is a view of the figure eight pattern created by the subject apparatus and method.
FIG. 3B is a schematic diagram showing the multiplicity of figure eight patterns similar to those created during operation of the subject apparatus and method.

With reference to FIGS. 1–5, operation of the polishing apparatus 50 moves the base plate 21 in a perfect figure eight pattern close to but not exactly the same as shown in FIG. 3A. As is known and in general, the parts of a figure eight may be occur in slightly varying shapes and still be recognizable as a perfect figure eight, and such is the case with the figure eight pattern created by the subject apparatus. In operation, the main drive motor 8 is energized to rotate the x1 drive pulley 3 and the y drive pulley 2 each of which, through their respective connecting rods 5 and 6, reciprocates the x1 stage plate 22 and the y stage plate 82. The cycles of movement of the x1 and y stages are illustrated in FIG. 4 which shows timing diagrams for the two stages on a common time line. As previously stated, the stroke of the x1 stage plate is twice the stroke of the y stage plate. Although each stage plate moves reciprocally along its individual axis, the resultant movement of the base plate is in a figure eight pattern.

Furthermore, with energization of the x2 drive motor 20, the x2 stage plate 11 and thus both of the y stage 10 and the x1 stage 9 are moved forwardly and rearwardly along the x2 axis so that the figure eight pattern is moved forwardly and rearwardly, similar to that illustrated in FIG. 3B. That is, although each individual figure eight pattern differs slightly from those shown in FIG. 3A and 3B, the overall pattern of moving figure eights, whereby a succession of multiple figure eights (eight as shown in FIG. 3B) is created, is generally as shown in FIG. 3B.

DETAILED DESCRIPTION OF THE SECOND EMBODIMENT

A second embodiment of the subject polishing apparatus is generally indicated by the numeral 50' in FIGS. 6–10. Because of the similarity of parts between the first and second embodiments, the second embodiment is for the most part described using reference numerals that are the same as used for the first embodiment but with a prime added to the number. The polishing apparatus 50' produces a figure eight pattern like the first embodiment of the apparatus 50 (FIGS. 1–5) but it does so using cams 2', 3' instead of pulleys 2, 3 and linkages 5, 6. Accordingly, the polishing apparatus 50' includes an x1 stage 9' (FIG. 8), a y stage 10', and an x2 stage 23'.

The x2 stage 23' (FIGS. 8, 9A, 9B) includes a pair of transversely spaced longitudinally extending x2 mounting blocks 24' supported on the bottom wall 54' of a casing or housing 28', as with the first embodiment of the apparatus. The x2 stage tracks 70' are secured to the mounting blocks 24 and extend substantially the full length thereof. These tracks thus define an x2 axis or path generally parallel to the left and right sidewalls 60' and 62'. Furthermore, the x2 stage provides inverted U-shaped x2 stage bodies or members 72' individually slideably mounted on the stage tracks for movement along the x2 axis. The x2 stage also includes a flat x2 stage plate 11' bridging and secured to the stage bodies in a substantially horizontal position when the bottom wall 54' of the casing is horizontal. The x2 stage plate is generally rectangular and flat and occupies an area slightly smaller in outside dimensions than the casing, as best seen in FIG. 9A. Accordingly, the x2 stage plate and stage bodies are free to move fore and aft within the casing on the x2 stage tracks. The length of the stroke of movement of the x2 stage plate is relatively minimal, from approximately ¾ inch to 1 inch of travel.

Figure 6:
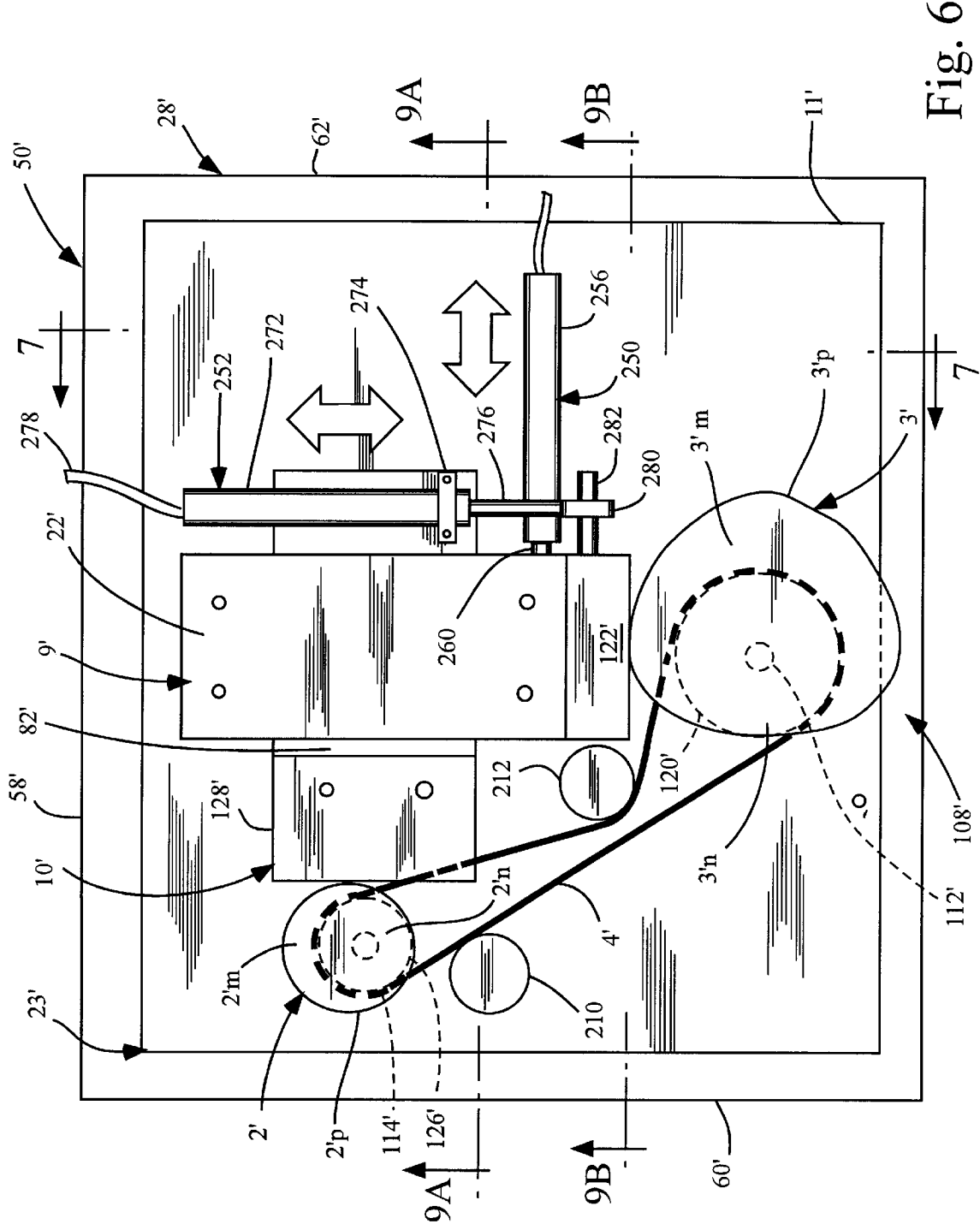
FIG. 6 is a schematic top plan view of another embodiment of the subject polishing apparatus.
Figure 7:
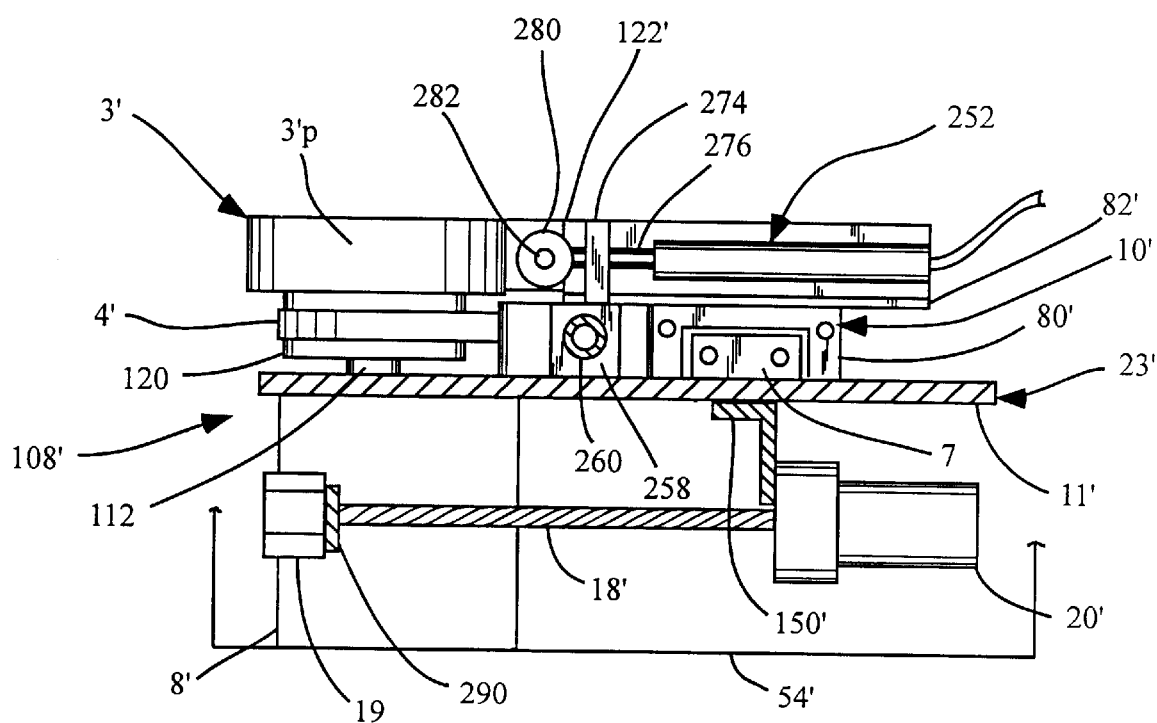
FIG. 7 is a longitudinal vertical cross-section taken along line 7—7 in FIG. 6.

The y stage 10' (FIGS. 6, 7, 8) provides a single elongated y stage track 78' (FIG. 8) mounted on and secured to the x2 stage plate 11' generally centrally thereof, extending in parallel relation to the front and rear walls 56' and 58', as best seen in FIG. 6. The y stage track is in right angular relation to the x2 axis (defined by the x2 stage tracks 70') and thus defines a y axis or path perpendicular to the x2 axis and parallel to the front and rear walls 56' and 58'. An inverted, U-shaped y stage body or member 80' (FIG. 8) is slideably mounted on the y stage track, and a y stage plate 82' is secured to the y stage body in generally parallel relation to the x2 stage plate 11'. The y stage plate is also flat and rectangular and generally coincident with the upper surface of the y stage body. Thus, the y stage plate and the y stage body are reciprocally moveable on the y stage track to the left and right, as viewed in FIG. 6, along the y axis. The y stage plate and body have a predetermined stroke to which reference will subsequently be made but similar to the stroke of the y stage plate 82 and y stage body 80 of the first embodiment 50 of the subject apparatus. A y cam follower 128' in the form of a rectangular block is secured to the left end of the y stage plate, as seen in FIGS. 6, 8, 9A and 10, for a purpose to be described.

The x1 stage 9' (FIG. 6) provides an x1 stage track 90' (FIGS. 9A and 9B) secured to the y stage plate 82' in right angular relation to the y stage track 78' and stage body 80'. The x1 stage track thus defines an x1 axis perpendicular to the y axis (defined by y stage track 78') but parallel with the x2 axis (defined by x2 stage tracks 70'). The x1 stage also includes an inverted U-shaped x1 stage body or member 92' slideably mounted on the stage track for reciprocal movement along the x1 axis. An x1 stage plate or interface plate 22' is secured to the x1 stage body in parallel relationship to the y stage plate 82' and the x2 stage plate 11' as best seen in FIG. 9B. Thus, the x1 stage plate is mounted for movement with the x1 stage body fore and aft of the casing 28' along the x1. An x1 cam follower 122' (FIGS. 6, 7, 8, 10) in the form of a rectangular block is secured to the forward end of the x1 stage body 92' for a purpose to be described.

A base plate 21' (FIG. 9A and 9B), similar to the base plate 21 (FIG. 2), is secured to the x1 stage plate 22' near the top of the apparatus. As with the base plate 21 in the first embodiment, the base plate 21' has a flat, top polishing surface 104' to which a polishing media, such as a film or a slurry, is applied for effecting the polishing action. As before, no further detail is provided for the polishing media and its applications since these are well known in the art.

A drive mechanism 108' (FIGS. 6–10) is provided for driving the polishing apparatus 50'. This drive mechanism includes an x1 cam 3' (FIGS. 6, 8) of the disc type having a roughly triangular profile or peripheral surface 3'p albeit with convex instead of straight sides. This peripheral surface is eccentric to a vertical drive shaft 112' rotatably journaled in the x2 stage plate 11' in upstanding relation to the x2 stage plate 11' forwardly of the x1 cam follower 122'. The cam is mounted so that its peripheral surface may be maintained in slideable engagement with the x1 cam follower, as best seen in FIG. 6, and as subsequently described in more detail. The cam provides a major lobe 3'm and a minor lobe 3'n whose minimum radius is less than the radius of the major lobe. A drive pulley 120' is secured underneath the x1 cam, as shown in dashed lines in FIG. 6 and otherwise visible in FIGS. 7 and 10, for example.

The drive mechanism 108' also includes a y cam 2' (FIGS. 6, 8) of the disc type but having a circular profile or peripheral surface 2'p. The y cam is eccentric to a vertical shaft 114' that is also mounted in the x2 stage plate 11' in an upstanding position to the left of the y cam follower 128' and with its peripheral surface in position to be maintained in engagement with this y cam follower. The y cam has a major lobe 2'm and a minor lobe 2'n. Further, a drive pulley 126' (seen in dashed lines in FIG. 6 but in full lines in FIGS. 8, 9A, 9B and 10) is secured to and underneath the y cam.

The drive mechanism 108' (FIGS. 6, 7) further includes an endless drive belt 4' extending around the drive pulleys 120' and 126' and against idler and tensioner pulleys 210 and 212 mounted on the x2 stage plate 11'. A first drive motor is generally indicated by the number 8' and is mounted under the x2 stage plate 11'. The drive motor is coupled to the x1 drive shaft 112' for rotating the x1 cam 3' and, through the drive belt 4', the y cam 2'.

In addition, the drive mechanism 108' (FIG. 6) includes y and x1 biasing units 250 and 252 for yieldably maintaining their cam followers 128' and 122' respectively against the y cam 2' and the x1 cam 3'. The y biasing unit includes a pneumatic y cylinder 256 supported on the x2 stage plate 11' (FIGS. 7, 8 and 9B), a y mounting bracket 258, a y piston rod 260 reciprocally moveable in the y cylinder and connected to a pin 266, projecting downwardly from the y stage plate 82', through a collar 264 on the piston rod and encircling the pin. A hose 262 supplies air to the cylinder which, when pressurized through the hose, yieldably urges the y cam follower 128' against the y cam 2'. It will be understood that the pressure supplied by the y biasing unit is yieldable to allow rotation of the y cam in order to reciprocate the y stage body 80' and y stage plate 82' left and right along the y axis.

Figure 8:
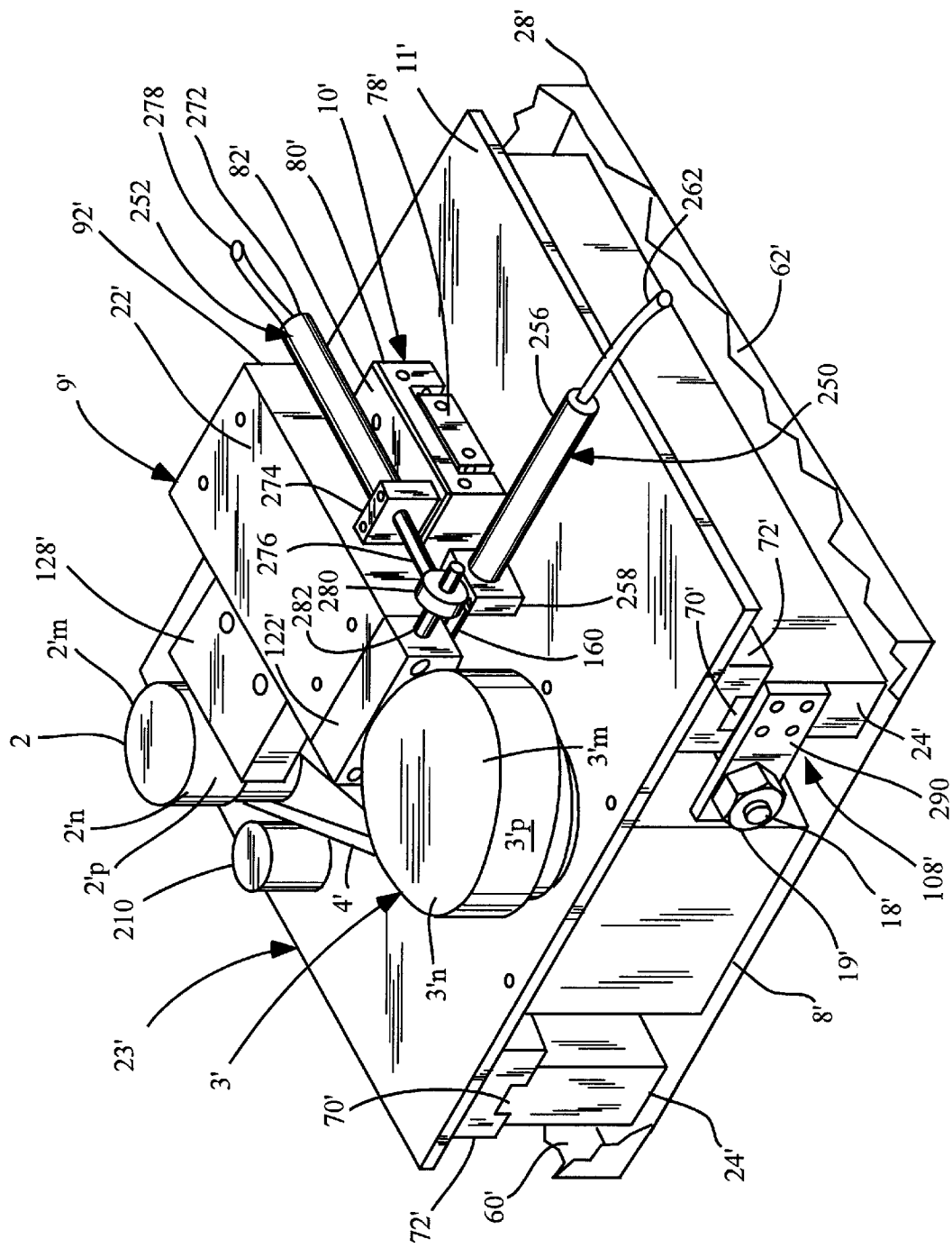
FIG. 8 is a top isometric view of the apparatus shown in FIG. 6 looking at the apparatus from a position at the upper right of FIG. 6 and showing the casing broken away.
Figure 9A:
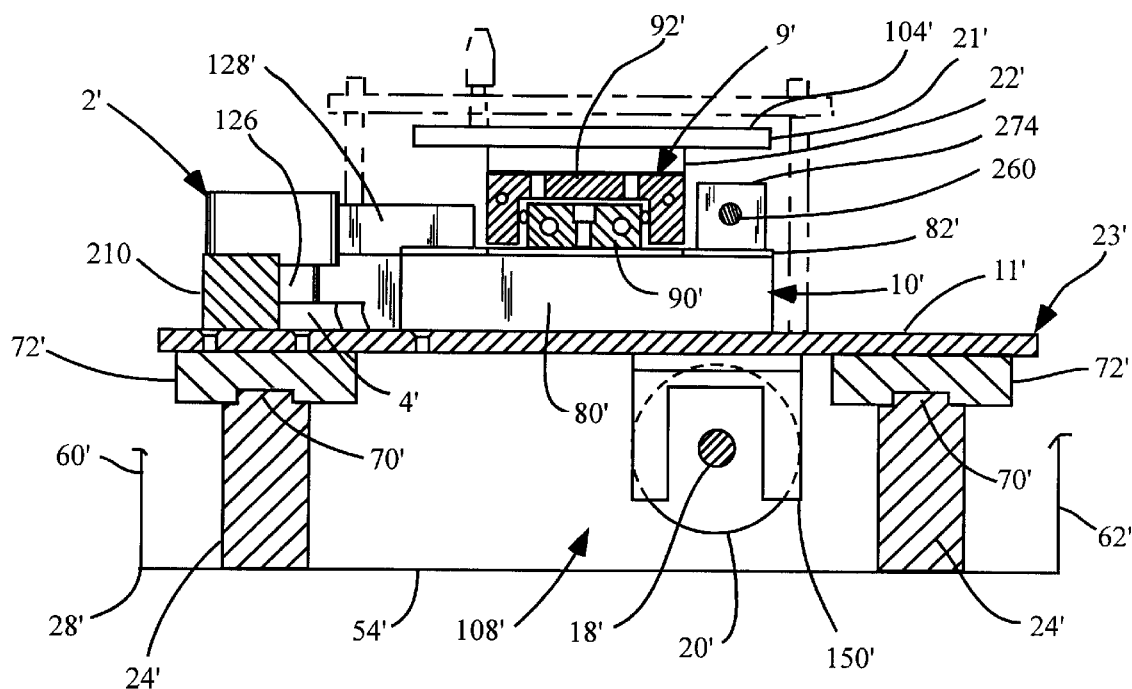
FIG. 9A is a schematic transverse vertical cross-section taken on line 9A–9B in FIG. 6, but showing in phantom a jig for holding fiber optic connectors in position to be polished by the subject apparatus.
Figure 9B:
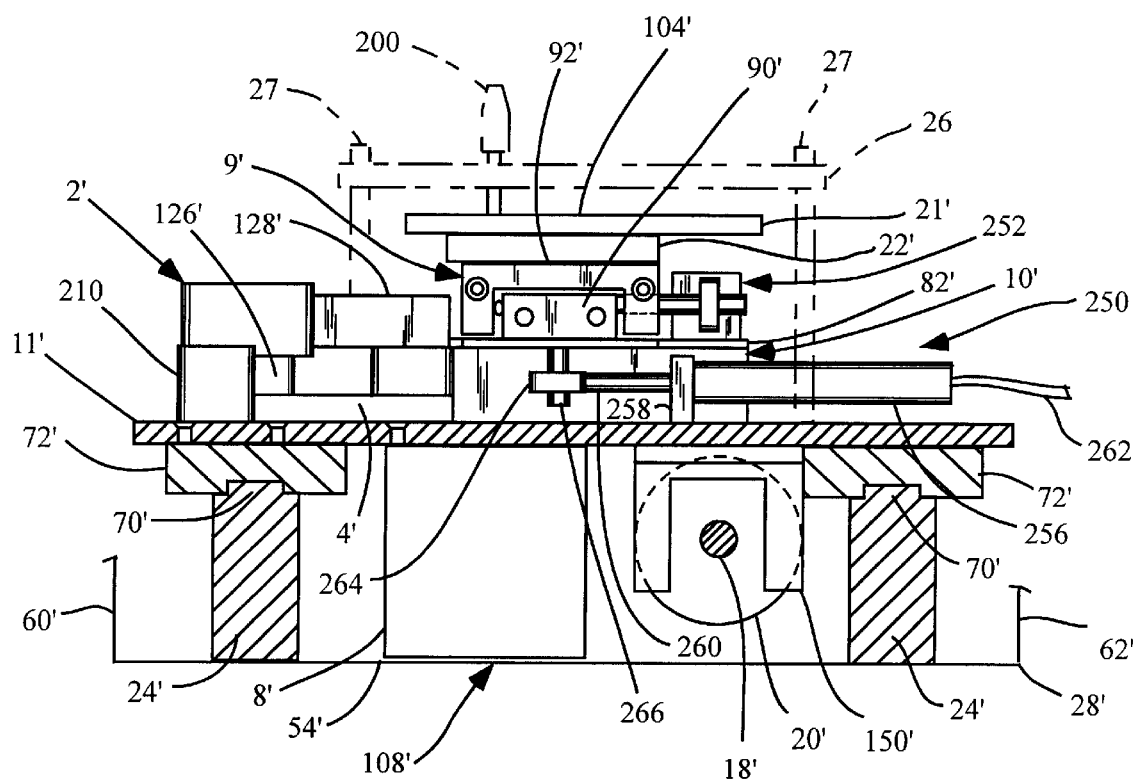
FIG. 9B is a schematic transverse vertical cross-section taken on line 9B—9B in FIG. 6, also showing the jig in phantom.
Figure 10:
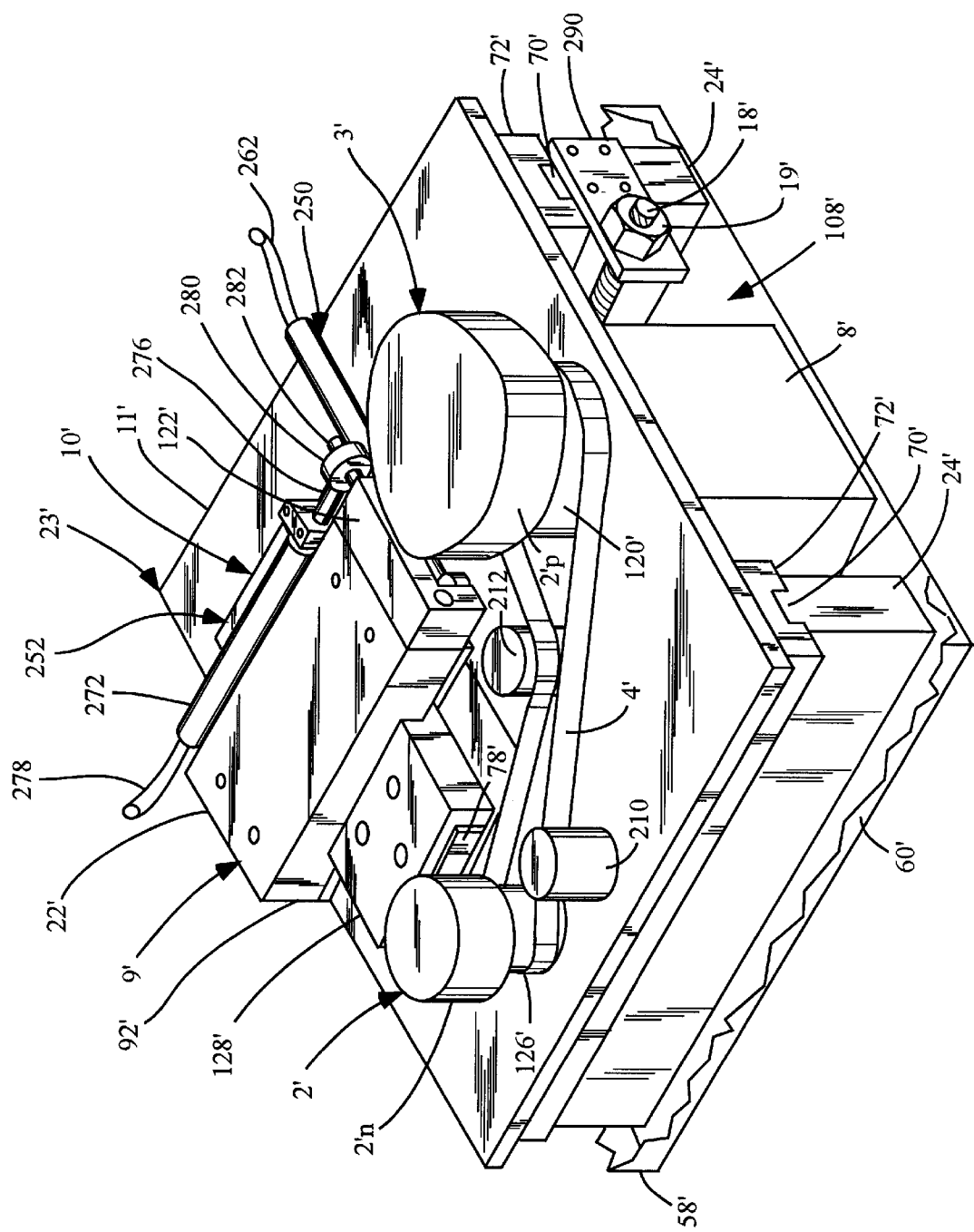
FIG. 10 is a top isometric view looking at the apparatus of FIG. 6 from a position at the upper left of FIG. 6 and with the casing being broken away.

The x1 biasing unit 252 (FIGS. 6, 7, 8) includes a pneumatic x1 cylinder 272 mounted on the y stage plate 82' in generally parallel relation to the x1 axis by the x1 mounting bracket 274, an x1 piston rod 276 reciprocally moveable in the x1 cylinder and connected to the x1 cam follower 122' by a collar 280 on the piston rod encircling a pin 282 that projects outwardly to the right of the x1 cam follower 122', as best seen in FIGS. 6 and 8. Also, a hose 278 supplies air to the x1 cylinder in order to pressurize the cylinder which then applies pressure to the x1 cam follower 122', yieldably maintaining it in engagement with the x1 cam 3'. This pressure is yieldable to allow the x1 cam to rotate thereby to reciprocate the x1 stage body 92' and the x1 stage plate 22' fore and aft of the apparatus 50'.

Similar in structure and function to the drive mechanism 108 (FIG. 1) in the first embodiment, the drive mechanism 108' (FIGS. 7 and 8) also includes an x2 drive motor 20' mounted on the x2 stage plate 11' by a bracket 150'. The x2 drive motor is coupled to a lead screw 18' that is parallel to the x2 axis. The lead screw is threaded into a lead nut 19' that is fixed to a bracket 290 attached to one of the x2 mounting blocks 24'.

Operation of the Second Embodiment

As with the first embodiment 50 of the subject apparatus, operation of the polishing apparatus 50' also moves the base plate 21' (FIGS. 9A and 9B) in a perfect figure eight pattern similar to that shown in FIG. 3B. Again, the figure eight may occur in slightly varying shapes and still be recognizable as a perfect figure eight, and such is the case with the figure eight pattern created by the apparatus 50'. In operation, the main drive motor 8' is energized to rotate the x1 and y cams 3' and 2' (FIG. 6) which respectively reciprocate the x1 stage plate 22' and the y stage plate 82'. During such rotation of the cams and reciprocal movement of these stages, the pneumatic biasing units 250 and 252 yieldably maintain the x1 and y cam followers 122' and 128' (connected to their respective x1 and y stage plates 22' and 82') against their respective x1 and y cams 3' and 2'.

The cycles of movement of the x1 and y stages 9' and 10' (FIG. 6) of this second embodiment 50' are similar to those illustrated in FIG. 4 for the first embodiment 50. That is, in this second embodiment, the stroke of the x1 stage plate is twice the stroke of the y stage plate. The x1 cam 3' has a greater throw than the y cam 2', via the major lobe 3'm versus the major lobe 2'm and the minor lobe 3'n versus the minor lobe 2'n, thereby providing profiles of these cams to accomplish this 2× multiple. Although each stage plate moves reciprocally along its individual x1 and y axis, the resultant movement of the base plate 21' from these two components of movement is a figure eight pattern.

Also, the x2 stage plate 11' (FIG. 6) of the second embodiment 50' slowly reciprocates forwardly and rearwardly of the apparatus along the x2 axis, as with the first embodiment 50. Accordingly, the figure eight pattern created by the polishing apparatus 50' is slowly moved fore and aft of the apparatus to create patterns similar to those shown in FIG. 3B. As the x2 stage plate moves the figure eight pattern, the polishing surface 104' is caused to polish the fiber optic connectors 200 which are mounted in a jig or fixture 26', shown in phantom in FIGS. 9A and 9B but similar to that shown in FIG. 2 for the first embodiment.

From the foregoing it will be understood that the polishing apparatus 50 or 50' allows use of all of the area of the polishing surface 104 or 104' to polish the connectors 200 or similarly configured industrial components. By using a figure eight polishing pattern that is uniform and constant, a full rectangular array of connectors 200 can be provided thereby allowing far more connectors to be polished simultaneously than previous polishing apparatus. In previous apparatus, not incorporating the principles of my inventions, such a large number of connectors to-be-polished cannot be accommodated since the connectors can be positioned only at the outer most edges or periphery of the rotating polishing surface that traces a circular pattern.

The subject apparatus 50 or 50' produces not only a uniform and constant figure eight polishing pattern (FIG. 3A), but it also moves the pattern back and forth to produce multiple figure eight patterns (FIG. 3B) and thereby prevent wear and burnout of the lapping film on the polishing surface 104 or 104' and thus allows for maximum usage of various polishing media, whether films or slurries. The subject polishing pattern is created by the described and illustrated mechanical motion control systems employing the components shown and described.

Although preferred embodiments of the present invention have been shown and described, various modification and substitutions may be made thereto without departing from the spirit and scope of the present invention. Accordingly, it is to be understood that the present invention has been described by way of illustration and not limitation.

What is claimed is:

1. A polishing apparatus, comprising:

a first stage including a first mounting member and a first staging member supported on the first mounting member for reciprocal movement along a first path, a second stage including a second mounting member supported on the first staging member and a second staging member supported on the second mounting member for reciprocal movement along a second path in angular relation to the first path, a polishing member mounted on the second staging member, and a drive mechanism including first and second cams maintained in engagement with the first and second staging member respectively and a driving mechanism connected to the cams causing them simultaneously to reciprocate the first and second staging members along their respective paths whereupon the polishing member traces a predetermined pattern.

2. The polishing apparatus of claim 1, wherein there is a biasing mechanism yieldably maintaining said engagement of the first and second cams and the first and second staging members during said reciprocation of the first and second staging members.

3. The polishing apparatus of claim 1, wherein the cams are rotary cams that upon rotation thereof reciprocate the first and second staging members.

4. The polishing apparatus of claim 3, wherein there are biasing units yieldably maintaining said engagement of the first and second cams and the first and second staging members during rotation of the cams causing said reciprocation of the first and second staging members.

5. The polishing apparatus of claim 4, wherein the biasing units are first and second pneumatic cylinders and piston rods respectively connected to the first and second staging members.

6. The polishing apparatus of claim 1, wherein the cams have eccentric peripheral surfaces;

wherein the maximum radii of the second cam is greater than the maximum radii of the first cam.

7. The polishing apparatus of claim 6, wherein the peripheral surface of one of the cams is circular; and wherein the peripheral surface of the other cam is non-circular and has major and minor lobes.

8. The polishing apparatus of claim 1, wherein one cam has an angular velocity that is a multiple of the angular velocity of the other cam;

wherein the peripheral surface of the other cam is non-circular and has major and minor lobes.

9. The polishing apparatus of claim 1, wherein one cam has an angular velocity that is a multiple of the angular velocity of the other cam.

10. The polishing apparatus of claim 9, wherein the multiple is 2.

11. The polishing apparatus of claim 1, wherein the paths of movement of the first and second staging members are rectilinear.

12. The polishing apparatus of claim 1,
wherein the velocity of the one staging member is a multiple of the velocity of the other staging member.

13. The polishing apparatus of claim 12,
wherein the multiple is 2.

14. The polishing apparatus of claim 1,
wherein the pattern is a figure eight.

15. The polishing apparatus of claim 1,
wherein the first mounting member is mounted for reciprocal movement along a third path.

16. A apparatus for polishing fiber optic connectors, comprising:
- a support adapted to hold fiber optic connectors in positions to be polished;
- an x stage including a lower track mounted on the casing and an x stage plate mounted on the lower track for reciprocal rectilinear movement along an x axis;
- a y stage including an upper track mounted on the x stage plate and an y stage plate mounted on the upper track for reciprocal rectilinear movement along a y-axis perpendicular to the x axis;
- a polishing member mounted on the y stage plate for engagement with such fiber optic connectors; and
- a drive mechanism including a rotary x cam having a predetermined profile and in engagement with the x stage, a rotary y cam having a smaller profile than the profile of the x cam and in engagement with the y stage, and a drive system connected to the cams for imparting rotation thereto.

17. The apparatus of claim 16,
wherein there are pneumatic biasing units yieldably maintaining the x and y stages in engagement with their respective cams during rotation thereof.

18. A method of polishing a workpiece with a polishing member that is mounted on one of a pair of stage members that are interconnected for rectilinear movement relative to each other, comprising the steps of:
- applying yieldable force through use of a first cam, to a first of the stage members to cause the first stage member to reciprocate along a first path,
- applying yieldable force through use of a second cam, to the other stage member to cause the other stage member to reciprocate along a second path that is angularly related to the first path and at a speed of movement that is a multiple of the speed of movement of the first stage member whereby the polishing member is caused to trace a predetermined pattern.

19. The method of claim 18, including the further step of:
maintaining the stage members and their respective cams in engagement during reciprocation of the stage members while allowing the cams to reciprocate their respective stage members.

20. The method of claim 18, including the further step of:
applying pneumatic pressure to the stage members yieldably urging the stage members against their respective cams.

\* \* \* \* \*